US012075300B2

United States Patent
Deshmukh et al.

(10) Patent No.: US 12,075,300 B2
(45) Date of Patent: *Aug. 27, 2024

(54) MITIGATING ADJACENT CHANNEL INTERFERENCE FOR A DUAL RADIO NETWORK DEVICE

(71) Applicant: HEWLETT PACKARD ENTERPRISE DEVELOPMENT LP, Houston, TX (US)

(72) Inventors: Amogh Guruprasad Deshmukh, Santa Clara, CA (US); Eldad Perahia, Park City, UT (US); Sachin Ganu, San Jose, CA (US); Mohd Shahnawaz Siraj, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/584,455

(22) Filed: Jan. 26, 2022

(65) Prior Publication Data

US 2023/0239758 A1 Jul. 27, 2023
US 2024/0080733 A9 Mar. 7, 2024

Related U.S. Application Data

(63) Continuation of application No. 16/862,189, filed on Apr. 29, 2020, now Pat. No. 11,259,310.

(51) Int. Cl.
*H04W 36/14* (2009.01)
*H04L 1/00* (2006.01)
(Continued)

(52) U.S. Cl.
CPC .......... *H04W 36/14* (2013.01); *H04L 1/0003* (2013.01); *H04W 36/00837* (2018.08); *H04W 36/22* (2013.01); *H04W 84/12* (2013.01)

(58) Field of Classification Search
CPC ... H04W 4/02; H04W 4/023; H04W 28/0226; H04W 36/14; H04W 36/16; H04W 36/20;
(Continued)

(56) References Cited

U.S. PATENT DOCUMENTS 8,630,230 B2    1/2014  Liu et al.
11,259,310 B2 * 2/2022  Deshmukh ............ H04W 74/08
(Continued)

OTHER PUBLICATIONS

Extreme Networks, Inc., "ExtremeMobility™ AP560 Series for Very Highly Dense Outdoor Venues", Data Sheet, 2020, pp. 1-12.

*Primary Examiner* — Kan Yuen
(74) *Attorney, Agent, or Firm* — Hewlett Packard Enterprise Patent Department

(57) ABSTRACT

Examples described herein mitigate adjacent channel interference for dual radios of a network device. Examples described herein may associate, by a network device, a first client device with a first radio of the network device, associate, by the network device, a second client device with a second radio of the network device, determine that the first and second client devices are within a steering threshold, and based on the determination that the first and second client devices are within the steering threshold, steer, by the network device, the second client device from the second radio to the first radio. Examples described herein may communicate, using the first radio of the network device, with the first and second client devices.

17 Claims, 10 Drawing Sheets

(51) Int. Cl.
*H04W 36/00* (2009.01)
*H04W 36/22* (2009.01)
*H04W 84/12* (2009.01)

(58) Field of Classification Search
CPC ........... H04W 36/22; H04W 36/00692; H04W 36/00837; H04W 76/15; H04W 76/20; H04W 84/12; H04W 92/10; H04W 36/06; H04L 1/0003
See application file for complete search history.

(56) References Cited

U.S. PATENT DOCUMENTS

| | | | |
|---|---|---|---|
| 2010/0081439 A1* | 4/2010 | Sie | H04W 16/04 455/562.1 |
| 2013/0235814 A1 | 9/2013 | Wietfeldt et al. | |
| 2014/0059218 A1* | 2/2014 | Ganu | H04B 17/318 709/224 |
| 2014/0219267 A1 | 8/2014 | Eyuboglu et al. | |
| 2015/0065133 A1* | 3/2015 | Cui | H04W 28/0819 455/436 |
| 2016/0081092 A1 | 3/2016 | Akhavan-Saraf et al. | |
| 2017/0055159 A1 | 2/2017 | Boppana et al. | |
| 2017/0111854 A1* | 4/2017 | Ho | H04B 7/14 |
| 2017/0265191 A1* | 9/2017 | Ahmed | H04W 72/0453 |
| 2018/0192464 A1 | 7/2018 | Park et al. | |
| 2018/0352497 A1* | 12/2018 | Taskin | H04W 36/38 |
| 2019/0082497 A1 | 3/2019 | Friedmann et al. | |
| 2019/0327616 A1* | 10/2019 | Ganu | H04W 28/086 |
| 2020/0205013 A1* | 6/2020 | John Wilson | H04W 16/14 |
| 2020/0288409 A1* | 9/2020 | Li | H04W 16/14 |
| 2022/0078727 A1* | 3/2022 | Chennichetty | G01S 5/0284 |

\* cited by examiner

MITIGATING ADJACENT CHANNEL INTERFERENCE FOR A DUAL RADIO NETWORK DEVICE

CROSS REFERENCE TO RELATED APPLICATIONS

This application is a continuation of, and claims the priority benefit of U.S. patent application Ser. No. 16/862,189, filed on Apr. 29, 2020, the contents of which are incorporated herein by reference in their entirety.

BACKGROUND

Wi-Fi 5 (also known as IEEE 802.11ac) is a wireless networking standard in the 802.11 set of local area network (LAN) protocols for high-throughput wireless communications in the 5 GHz frequency band. The Wi-Fi 5 standard specifies 5 GHz wireless communications for radio frequency (RF) bandwidths of up to 160 MHz, for up to eight spatial streams, for downlink multi-user multiple-input and multiple-output (DL-MIMO) transmissions for up to four clients, and for modulation schemes of up to 256 quadrature amplitude modulation (256-QAM).

Recently, there have been efforts to develop dual radio network devices which can be configured such that one of the radios operates at a different channel in a given frequency band (e.g., 5 GHz band) than the other one of the radios. Such dual radio network devices can serve a greater number of client devices and can provide increased throughput capacity in a given frequency band as compared to single radio network devices.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

Despite the great potential that dual radio network devices offer for serving a greater number of client devices and for providing increased throughput capacity for wireless communications in a given frequency band, existing techniques for operating dual radio network devices may result in adjacent channel interference (ACI). For instance, as discussed herein, it has been discovered that when a dual 5 GHz radio network device simultaneously receives uplink traffic from a client device by one 5 GHz radio and transmits downlink traffic to another client device by another 5 GHz radio, ACI may affect throughput performance by increasing a packet error rate of the downlink traffic, which in turn, decreases the modulation and coding schemes and corresponding data rates which are available for the downlink traffic.

As used herein, "adjacent channel interference" or "ACI" refers to interference on a signal in a wireless communication channel which is caused by extraneous power from another signal in an adjacent channel. ACI may be caused by, for instance, inadequate filtering, improper tuning, poor frequency control, or a combination thereof.

To address these issues, examples described herein mitigate adjacent channel interference for a dual radio network device. Examples described herein may associate, by a network device, a first client device with a first radio of the network device, associate, by the network device, a second client device with a second radio of the network device, determine, by the network device, that the first and second client devices are within a steering threshold, and based on the determination that the first and second client devices are within the steering threshold, steer, by the network device, the second client device from the second radio to the first radio. Examples described herein may communicate, using the first radio of the network device, with the first and second client devices.

In this manner, examples described herein may mitigate ACI for a dual radio network device. For instance, in such examples, the network device may, based on the determination that the first and second client devices are within the steering threshold, steer the second client device from the second radio to the first radio, thereby avoiding simultaneously receiving uplink traffic from the first client device by the first radio and transmitting downlink traffic to the second client device by the second radio when ACI would (or may) occur between such communications. Moreover, in such examples, the network device may communicate, using the first radio, with the first and second client devices, thereby providing communications with the first and second client devices while mitigating ACI between such communications. Accordingly, examples described herein may mitigate ACI for a dual radio network device.

Figure 1:
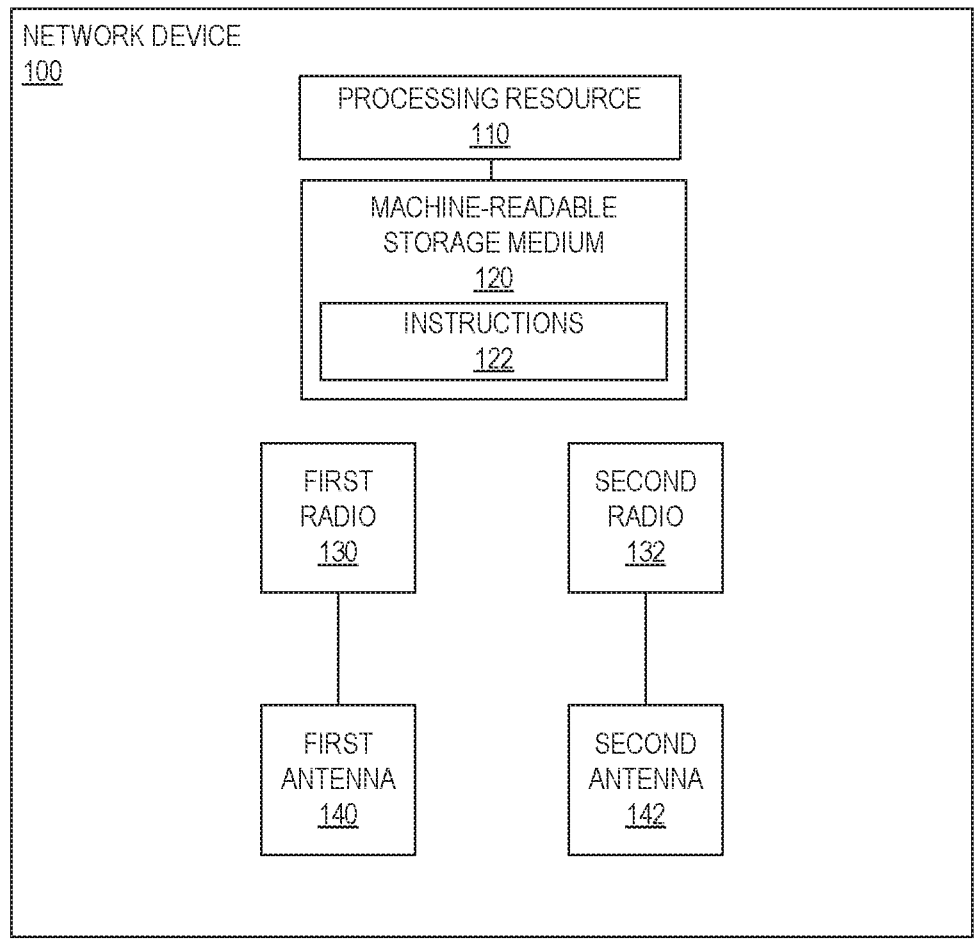
FIG. 1 is a block diagram of an example dual radio network device 100 for mitigating adjacent channel interference.

Referring now to the drawings, FIG. 1 is a block diagram of an example dual radio network device 100 for mitigating ACI, Network device 100 includes at least one processing resource 110 and at least one machine-readable storage medium 120 comprising (e.g., encoded with) at least instructions 122 that are executable by the at least one processing resource 110 of network device 100 to implement functionalities described herein in relation to instructions 122.

In the example of FIG. 1, network device 100 may engage in any network data transmission operations, including, but not limited to, switching, routing, bridging, or a combination thereof. In some examples, network device 100 may comprise a wireless access point (WAP). In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device 100 may be any suitable type(s) of network devices made by any suitable manufacturer(s).

In the example of FIG. 1, network device 100 includes a first radio 130 and a second radio 132. Each of first radio 130 and second radio 132 may comprise a transceiver. In addition, each of first radio 130 and second radio 132 may operate at one or more frequency bands which conform to one or more IEEE standards for the 5 GHz band (e.g., 802.11ac, 802.11n, etc.). Furthermore, first radio 130 may operate at one or more channels in the 5 GHz band, and second radio 132 may operate at one or more channels in the 5 GHz. For example, first radio 130 and second radio 132 may each operate at one or more channels and one or more sub-bands within the Unlicensed National Information Infrastructure (U-NII) radio band for 5 GHz. In such example, first radio 130 may operate at a first frequency band and second radio 132 may operate at a second frequency band, wherein one of the first and second frequency bands is in the range of 5.150-5.350 GHz, and the other one of the first and second frequency bands is in the range of 5.470-5.850 GHz. It will be understood by one skilled in the art that first radio 130 and second radio 132 may operate at any suitable frequency band(s) (e.g., 2.4 GHz, 6 GHz, etc.); any suitable channels and bandwidths (i.e., channel widths) within such frequency band(s), and may conform to any suitable type(s) of wireless communication standards, now known and later developed. Moreover, although FIG. 1 shows that network device 100 includes two radios 130 and 132, it will be understood by one skilled in the art that network device 100 may comprise four, eight, or any suitable number of radios.

As used herein, an "Unlicensed National Information Infrastructure radio band" or "U-NII radio band" is a part of the unlicensed radio frequency (RF) spectrum used by IEEE 802.11 compatible devices and wireless Internet service providers (ISPs) for Wi-Fi communications. Currently, U-NII allocates Wi-Fi channels in the 5 GHz band across four sub-bands: U-NII-1 (5.150 to 5.250 GHz), U-NII-2 (5.250 GHz to 5.725 GHz), U-NII-3 (5.725 GHz to 5.850 GHz), and U-NII-4 (5.850 GHz to 5.925 GHz).

In the example of FIG. 1, network device includes a first antenna 140 connected to first radio 130 and a second antenna 142 connected to second radio 132. In some examples, each of first antenna 140 and second antenna 142 may transmit (e.g., radiate) and/or receive (e.g., intercept) directional signals, omnidirectional signals, or a combination thereof. As used herein, a "directional" signal refers to a signal which radiates more strongly in one or more directions as compared to one or more other directions along an azimuth plane (i.e., horizontal plane), whereas an "omnidirectional" signal refers to a signal which radiates equally in all directions along an azimuth plane. In some examples, each of first antenna 140 and second antenna 142 may comprise a phased array antenna. As used herein, a "phased array antenna" refers to an array of antennas which can create a directional signal which can be electronically steered to point in different directions without moving the antennas. Moreover, a phased array antenna may comprise an array of directional and/or omnidirectional antennas which can focus RF energy towards specific spatial directions. It will be understood by one skilled in the art that each first antenna 140 and second antenna 142 may comprise any suitable type(s) of antenna, now known and later developed. Moreover, although FIG. 1 shows that network device 100 includes two antennas, it will be understood by one skilled in the art that network device 100 may comprise four, eight, or any suitable number of antennas.

In the example of FIG. 1, instructions 122 may be executable by processing resource 110 to associate a first client device with first radio 130 of network device 100. Furthermore, instructions 122 may comprise instructions to associate a second client device with second radio 132 of network device 100. Instructions 122 to associate a client device (e.g., first client device, second client device, etc.) with a radio (e.g., first radio 130, second radio 132, etc.) of network device 100 may comprise instructions to transmit and/or receive one or more management frames, including, but not limited to, instructions to: transmit a beacon frame to the client device, receive a probe request from the client device, transmit a probe response to the client device, receive an authentication frame from the client device, transmit an association, re-association, and/or disassociation frame to the client device, or a combination thereof.

In the example of FIG. 1, instructions 122 may be executable by processing resource 110 to determine that the first and second client devices are within a steering threshold. In examples described herein, a "steering threshold" comprises one or more levels, conditions, and/or values that operate as a trigger for one client device (e.g., first client device, second client device, etc.) associated with one radio (e.g., one of first radio 130 and second radio 132) of a network device to be steered to (e.g., associated with) another radio (e.g., the other one of first radio 130 and second radio 132) of the network device. In some examples, the steering threshold may comprise a predetermined distance between the first and second client devices. Furthermore, the predetermined distance may correspond to a distance at which ACI would occur during simultaneous communication by the network device with the first and second client devices. For instance, the predetermined distance may correspond to a distance at which ACI would occur while simultaneously receiving, by first radio 130, uplink traffic from the first client device and transmitting, by second radio 132, downlink traffic to the second client device. In some examples, the predetermined distance may be less than or equal to one foot, less than or equal to six inches, etc. It will be understood by one skilled in the art that the predetermined distance may be any suitable distance at which ACI would (or may) occur during simultaneous communication by network device 100 with the first and second client devices using first radio 130 and second radio 132. In some examples, instructions 122 to determine that the first and second client devices are within the steering threshold may be independent of an actual distance between the first and second client devices. For instance, instructions 122 may comprise instructions to determine that the first and second client devices are within the steering threshold, even though at the time of such determination, an actual distance between the first and second client devices is beyond (i.e., greater than) a predetermined distance at which ACI would occur during simultaneous communication by the network device with the first and second client devices.

In the example of FIG. 1, instructions 122 may be executable by processing resource 110 to receive instructions to simultaneously receive uplink traffic from the first client device by first radio 130 and transmit downlink traffic to the second client device by second radio 132. Furthermore, instructions 122 may comprise instruction to, based on (e.g., in response to) receiving the instructions to simultaneously receive uplink traffic from the first client device by first radio 130 and transmit downlink traffic to the second client device by second radio 132, determine that the first client device and the second client device are within the steering threshold.

In the example of FIG. 1, instructions 122 may be executable by processing resource 110 to simultaneously receive, by first radio 130, uplink traffic from the first client device and transmit, by second radio 132, downlink traffic to the second client device. Furthermore, instructions 122 may comprise instruction to, based on (e.g., in response to) receiving the instructions to simultaneously receive uplink traffic from the first client device and transmit downlink traffic to the second client device, determine that the first client device and the second client device are within the steering threshold.

In the example of FIG. 1, instructions 122 may be executable by processing resource 110 to, based on (e.g., in response to) the determination that the first and second client devices are within the steering threshold, steer the second client device from second radio 132 to first radio 130. Moreover, instructions 122 to steer the second client device from second radio 132 to first radio 130 may comprise instructions to disassociate the second client device with second radio 132 and to associate the second client device with first radio 130. In addition, instructions 122 may comprise instructions to transmit a message to the second client device to instruct the second client device to disassociate with second radio 132 and associate with first radio 130. Such message may comprise an 802.11v Basic Service Set (BSS) transition management request. It will be understood by one skilled in the art that the message may comprise one or more messages having any suitable format(s) which can be used to instruct the second client device to disassociate with second radio 132 and associate with first radio 130.

In the example of FIG. 1, instructions 122 may be executable by processing resource 110 to communicate, using first radio 130, with the first and second client devices. Furthermore, instructions 122 to communicate with the first and second client devices may comprise instructions to receive, by first radio 130, uplink traffic from the first client device, and transmit, by first radio 130, downlink traffic to the second client device. Instructions 122 to receive uplink traffic from the first client device may comprise instructions to receive (e.g., intercept), by first antenna 140 connected to first radio 130, uplink traffic from the first client device. In addition, instructions 122 to transmit downlink traffic to the second client device may comprise instructions to transmit (e.g., radiate), by first antenna 140 connected to first radio 130, downlink traffic to the second client device. Moreover, instructions 122 to communicate with the first and second client devices may be based on a contention-based channel access protocol (e.g., 802.11 channel access contention), which performs collision avoidance, collision detection and recovery, or a combination thereof. It will be understood by one of ordinary skill in the art that communications by network device 100 with multiple network devices (e.g., first client device and second client device) using a single radio (e.g., first radio 130, second radio 132, etc.) may be based on any suitable channel access protocol, now known or later developed.

Alternatively, in the example of FIG. 1, instructions 122 may be executable by processing resource 110 to, based on (e.g., in response to) the determination that the first and second client devices are within the steering threshold, steer the first client device from first radio 130 to second radio 132. Moreover, instructions 122 to steer the first client device from first radio 130 to second radio 132 may comprise instructions to disassociate the first client device with first radio 130 and to associate the first client device with second radio 132. In addition, instructions 122 may comprise instructions to transmit a message to the first client device to instruct the first client device to disassociate with first radio 130 and associate with second radio 132. Such message may comprise an 802.11v BSS transition management request. It will be understood by one skilled in the art that the message may comprise one or more messages having any suitable format(s) which can be used to instruct the first client device to disassociate with first radio 130 and associate with second radio 132.

In such example of FIG. 1, instructions 122 may be executable by processing resource 110 to communicate, using second radio 132, with the first and second client devices. Furthermore, instructions 122 to communicate with the first and second client devices may comprise instructions to receive, by second radio 132, uplink traffic from the first client device, and transmit, by second radio 132, downlink traffic to the second client device. Instructions 122 to receive uplink traffic from the first client device may comprise instructions to receive (e.g., intercept), by second antenna 142 connected to second radio 132, uplink traffic from the first client device. In addition, instructions 122 to transmit downlink traffic to the second client device may comprise instructions to transmit (e.g., radiate), by second antenna 142 connected to second radio 132, downlink traffic to the second client device. Moreover, instructions 122 to communicate with the first and second client devices may be based on a contention-based channel access protocol which performs collision avoidance, collision detection and recovery, or a combination thereof.

In the example of FIG. 1, instructions 122 may be executable by processing resource 110 determine a first estimated location of the first client device. Furthermore, instructions 122 may comprise instructions to determine a second estimated location of the second client device. Instructions 122 to determine an estimated location (e.g., first estimated location, second estimated location, etc.) of a client device (e.g., first client device, second client device, etc.) may comprise instructions to provide location-based services using Wi-Fi, Bluetooth, Bluetooth Low Energy (BLE), ZigBee, cellular communications (e.g., 3G, 4G, 5G), or a combination thereof. It will be understood by one skilled in the art that location-based services may use any suitable type(s) of communication technologies, now known and later developed.

In the example of FIG. 1, instructions 122 may be executable by processing resource 110 to, based on (e.g., in response to) the determination of the first and second estimated locations, determine that a distance between the first and second estimated locations is within a predetermined distance. Moreover, instructions 122 may comprise instructions to, based on (e.g., in response to) the determination that the distance between the first and second estimated locations is within the predetermined distance, determine that the first and second client devices are within the steering threshold.

In the example of FIG. 1, instructions 122 may be executable by processing resource 110 to determine that the first client device is registered to a first user. Furthermore, instructions 122 may comprise instructions to determine that the second client device is registered to a second user. Instructions 122 to determine that a client device (e.g., first client device, second client device, etc.) is registered to a user (e.g., first user, second user, etc.) may comprise instructions to receive user information associated with the client device. A user (e.g., first user, second user) may comprise any physical or logical entity (e.g., one or more persons, one or more computing devices, one or more network addresses, etc.) that may be associated with a client device (e.g., first client device, second client device, etc.) Moreover, instructions 122 to receive user information may comprise instructions to transmit, to a controller, a request to receive user information associated with the client device. In addition, instructions 122 to receive user information may comprise instruction to, based on (e.g., in response to) transmitting the request to receive user information associated with the client device, receive user information associated with the client device from the controller.

As used herein, a "controller" refers at least one processing resource and at least one machine-readable medium comprising (e.g., encoded with) at least instructions that are executable by the at least one processing resource to manage one or more network infrastructure devices (e.g., network device 100) of one or more networks. In some examples, the controller may comprise one or more cloud-based resources. Furthermore, in some examples, the controller may comprise a WAP that operates as a virtual controller. The controller may gather network operating information from various nodes of one or more networks, including network traffic load information, network topology information, network usage information, etc. Moreover, the controller may transmit commands to various nodes of the one or more networks to alter network topology and network routing to achieve various network efficiency and efficacy goals.

In the example of FIG. 1, instructions 122 may be executable by processing resource 110 to determine that the first user is the same as the second user. The first user may be determined to be the same as the second user when one or more entities of the first user matches one or more entities of the second user. Moreover, instructions 122 may comprise instructions to, based on (e.g., in response to) the determination that the first user is the same as the second user, determine that the first and second client devices are within the steering threshold.

In the example of FIG. 1, instructions 122 may be executable by processing resource to determine a first timestamp that identifies when uplink traffic is received from the first client device by first radio 130 of network device 100. Furthermore, instructions 122 may comprise instructions to determine a second timestamp that identifies when downlink traffic is transmitted to the second client device by second radio 132 of network device 100. In addition, instructions 122 may comprise instructions to determine that the first timestamp corresponds to a same time as the second timestamp. In some examples, the first timestamp may correspond to the same time as the second timestamp when a first time identified by the first timestamp is identical to a second time identified by the second timestamp. Alternatively, the first timestamp may correspond to the same time as the second timestamp when the first time identified by the first timestamp is within a predetermined time period from (but not necessarily identical to) the second time identified by the second timestamp. Moreover, instructions 122 may comprise instructions to, based on (e.g., in response to) the determination that the first timestamp corresponds to the same time as the second timestamp, determine that the first and second client devices are within the steering threshold.

In the example of FIG. 1, instructions 122 may be executable by processing resource 110 to determine a first modulation and coding scheme (MCS) index value of uplink traffic received from the second client device by second radio 132 of network device 100. Furthermore, instructions 122 may comprise instructions to determine a second MCS index value of downlink traffic transmitted to the second client device by second radio 132 of network device 100. As used herein, a "modulation and coding scheme index value" or "MCS index value" refers to a value that represents a set of metrics associated with a modulation and coding scheme for network traffic. Such metrics may include, for example, a number of spatial streams, modulation type (e.g., QAM), coding rate, data rate, channel width, guard interval, or a combination thereof.

In the example of FIG. 1, instructions 122 may be executable by processing resource 110 to determine that a difference between the first and second MCS index values is above a predetermined value. Furthermore, instructions 122 may comprise instructions to, based on (e.g., in response to) the determination that the difference between the first and second MCS index values is above the predetermined value, determine the first and second timestamps.

In the example of FIG. 1, instructions 122 may be executable by processing resource to determine that a signal to noise ratio (SNR) of traffic between network device 100 and the second client device is above a predetermined threshold. As used herein, a "signal to noise ratio" or "SNR" refers to a ratio of a signal strength (i.e. signal power) for a given signal (e.g., network traffic) over a strength of background noise (i.e., noise power). The traffic between network device 100 and the second client device may comprise uplink traffic received from the second client device by second radio 132 of network device 100, downlink traffic transmitted to second client device by second radio 132 of network device 100, or a combination thereof. Instructions 122 may comprise instructions to, based on (e.g., in response to) the determination that the SNR of the traffic is above the predetermined threshold, determine the first and second MCS index values.

In this manner, the example dual radio network device 100 of FIG. 1 may mitigate ACI. For instance, in such examples, network device 100 may determine that the first and second client devices are within a steering threshold, and based on the determination that the first and second client devices are within the steering threshold, steer the second client device from second radio 132 to first radio 130, thereby avoiding simultaneously receiving uplink traffic from the first client device by first radio 130 and transmitting downlink traffic to the second client device by second radio 132 when ACI would (or may) occur between such communications. Moreover, in such examples, network device 100 may communicate, using first radio 130, with the first and second client devices, thereby providing communications with the first and second client devices while mitigating ACI between such communications.

Figure 2A:
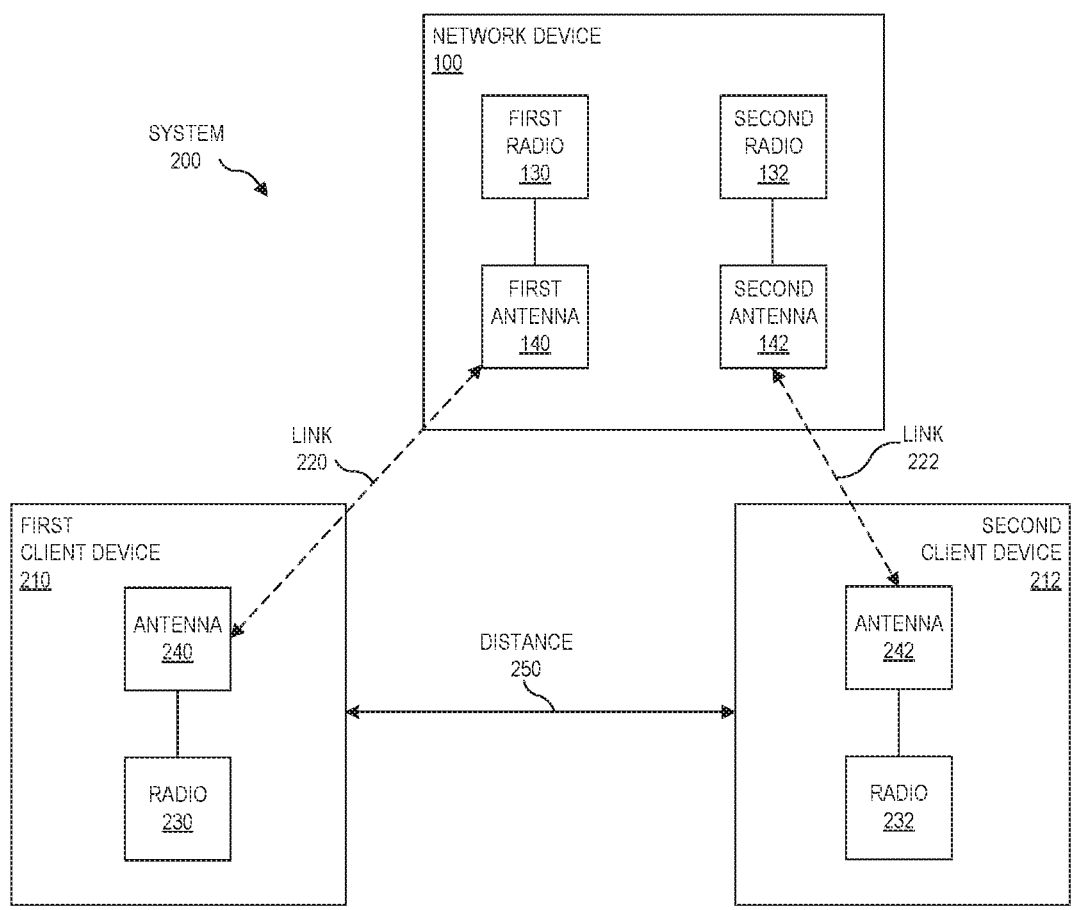
FIGS. 2A and 2B are block diagrams of an example system 200 for mitigating adjacent channel interference for a dual radio network device.
Figure 2B:
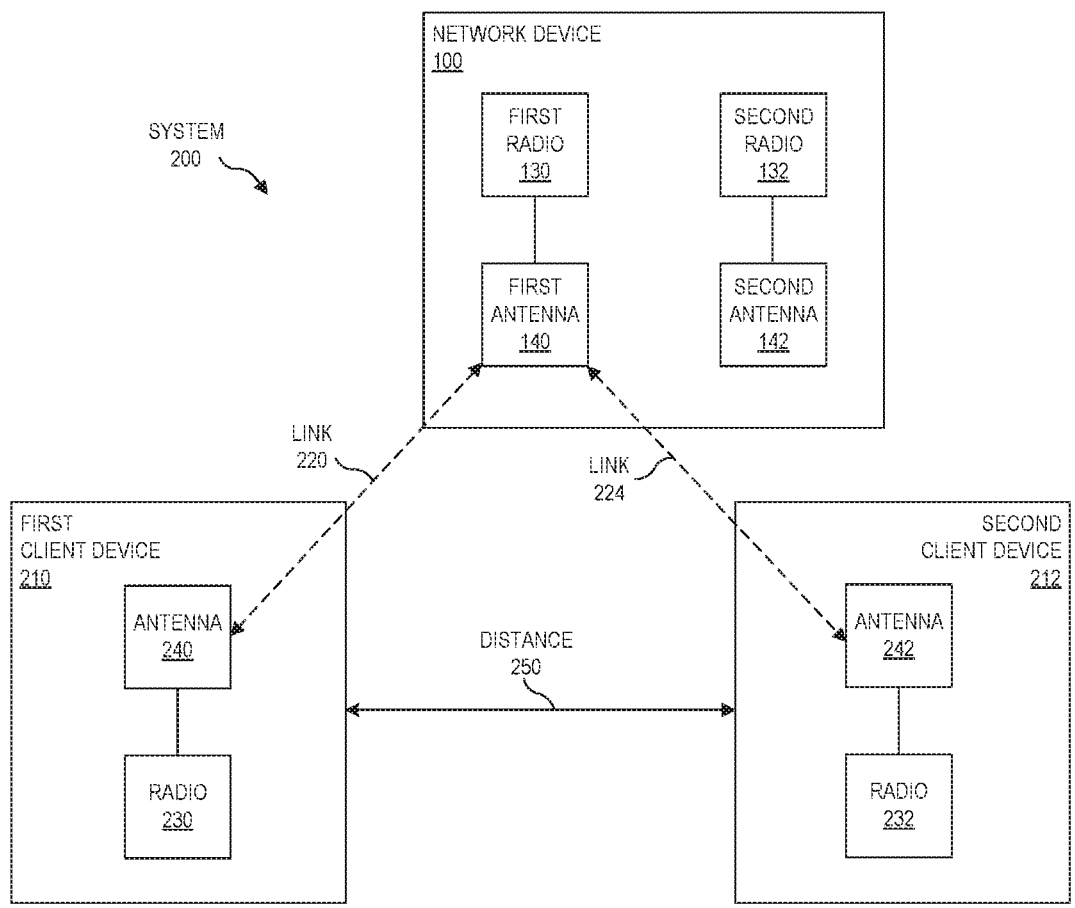

FIGS. 2A and 2B are block diagrams of an example system 200 for mitigating adjacent channel interference for a dual radio network device. System 200 may include network device 100, as described above in relation to FIG. 1. Moreover, system 200 may include a controller for managing one or more network infrastructure devices (including network device 100), as described above in relation to claim 1.

In the example of FIGS. 2A and 2B, system 200 may comprise a network, wherein network device 100 is connected to the network. The network may comprise one or more local area networks (LANs), virtual LANs (VLANs), wireless local area networks (WLANs), virtual private networks (VPNs), wide area networks (WANs), the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, system 200 may comprise a cellular network that uses any suitable communications standard (e.g., 3G, 4G, 5G, etc.). It will be understood by one skilled in the art that system 200 may comprise any suitable type(s) of network(s), now known or later developed.

In the example of FIGS. 2A and 2B, system 200 may include first client device 210 and second client device 212. Each of first client device 210 and second client device 212 may comprise a processor, memory, and input/output interfaces for wired and/or wireless communications. First client device 210 and/or second client device 212 may comprise a laptop computer, a desktop computer, a mobile device, and/or other wireless devices, although examples of the disclosure are not limited to such devices. As used herein, a "mobile device" refers to a device that is (or may be) carried and/or worn by a user. For instance, a mobile device can be a phone (e.g., a smartphone), a tablet, a personal digital assistant (PDA), smart glasses, and/or a wrist-worn device (e.g., a smartwatch), among other types of mobile devices. For example, first client device 210 may comprise a laptop, and second client device 212 may comprise a smartphone. Although FIGS. 2A and 28 show that system 200 includes two client devices 210 and 212, it will be understood by one skilled in the art that system 200 may comprise any suitable number(s) of client devices.

In the example of FIGS. 2A and 2B, first client device 210 includes a radio 230, and second client device 212 includes a radio 232. Each radio (230, 232) may comprise a transceiver and/or a separate transmitter and receiver. In addition, each radio (230, 232) may operate at one or more frequency bands which conform one or more IEEE standards for the 5 GHz band (e.g., 802.11ac, 802.11n, etc.). Furthermore, each radio (230, 232) may operate at one or more channels in the 5 GHz band. For example, each radio (230, 232) may operate at one or more channels and one or more sub-bands within the U-NII radio band for 5 GHz. In such example, radio 230 may operate at a first frequency band and radio 232 may operate at a second frequency band, wherein one of the first and second frequency bands is in the range of 5.150-5.350 GHz, and the other one of the first and second frequency bands is in the range of 5.470-5,850 GHz. It will be understood by one skilled in the art each radio (230, 232) may operate at any suitable frequency band(s) (e.g., 2.4 GHz, 6 GHz, etc.), any suitable channels and bandwidths within such frequency band(s), and may conform to any suitable type(s) of wireless communication standards, now known and later developed. Moreover, although FIGS. 2A and 2B show that first client device 210 includes a single radio 230 and second client device 212 includes a single radio 232, it will be understood by one skilled in the art that each client device (e.g., first client device 210, second client device 212, etc.) of system 200 may comprise two, four, eight, or any suitable number of radios.

In the example of FIGS. 2A and 2B, first client device 210 includes an antenna 240 connected to radio 230 and second client device 212 comprises an antenna 242 connected to radio 232. In some examples, each antenna (240, 242) may transmit (e.g., radiate) and/or receive (e.g., intercept) directional signals, omnidirectional signals, or a combination thereof. In some examples, each antenna (240, 242) may comprise a phased array antenna. It will be understood by on skilled in the art that each antenna (240, 242) may comprise any suitable type(s) of antenna, now known and later developed. Moreover, although FIGS. 2A and 2B show that first client device 210 includes a single antenna 240 and second client device 212 includes a single antenna 242, it will be understood by one skilled in the art each client device (e.g., first client device 210, second client device 212, etc.) of system 200 may comprise two, four, eight, or any suitable number of antennas.

As shown in FIG. 2A, network device 100 associates first client device 210 with first radio 130 of network device 100. Furthermore, network device 100 associates second client device 212 with second radio 132 of network device 100. Network device 100 associates first client device 210 with first radio 130 by establishing link 220 between first antenna 140 and antenna 240, and network device 100 associates second client device 212 with second radio 132 by establishing link 222 between second antenna 142 and antenna 242. Each link 220, 222 may use any suitable data transmission protocol(s), including at least one connection-oriented protocol such as Transmission Control Protocol (TCP), at least one connectionless protocol such as User Datagram Protocol (UDP), or a combination thereof. It will be understood by one skilled in the art that each link (e.g., link 220, link 222, etc.) of system 200 may use any suitable type(s) of data transmission protocol(s), now known or later developed. Moreover, although FIG. 2A shows that a single client device first client device 210) is associated with first radio 130 and a single client device (i.e., second client device 212) is associated with second radio 132, it will be understood by one skilled in the art that any suitable number(s) of client devices may be associated with each radio (e.g., first radio 130, second radio 132, etc.) of network device 100.

As shown in FIG. 2A, network device 100 determines that first client device 210 and second client device 212 are within a steering threshold. In one example, network device 100 determines that first client device 210 and second client device 212 are within the steering threshold based on (e.g., in response to) a determination that a distance 250 between first client device 210 and second client device 212 is within a predetermined distance. In such example, the predetermined distance may be based on a distance between antenna 240 of first client device 210 and antenna 242 of second client device 242. It will be understood by one skilled in the art that the predetermined distance may be any distance at which ACI would (or may) occur during simultaneous communication by network device 100 with first and second client devices 210 and 212 using first radio 130 and second radio 132. In another example, network device 100 determines that first client device 210 and second client device 212 are within the steering threshold, independent of distance 250 between first client device 210 and second client device 212 at the time of such determination. For instance, network device 100 may determine that first client device 210 and second client device 212 are within the steering threshold, even though at the time of such determination, distance 250 between first client device 210 and second client device 212 is beyond (i.e., greater than) the predetermined distance.

As shown in FIG. 2B, based on (e.g., in response to) the determination that first client device 210 and second client device 212 are within the steering threshold, network device 100 steers second client device 212 from second radio 132 to first radio 130. Network device 100 steers second client device 212 from second radio 132 to first radio 130 by disassociating second client device 212 with second radio 132 (i.e., terminating link 222 between second antenna 142 and antenna 242) and associating second client device (i.e., establishing link 224 between first antenna 140 and antenna 242).

As shown in FIG. 2B, network device 100 communicates, using first radio 130, with first client device 210 and second client device 212. Network device 100 communicates with first client device 210 via link 220. For instance, network device 100 receives, by first radio 130, uplink traffic from the first client device. Specifically, network device 100 receives, by first antenna 140 connected to first radio 130, uplink traffic from antenna 240 of first client device 210. Moreover, network device 100 communicates with second client device 212 via link 224. For instance, network device 100 transmits, by first radio 130, downlink traffic to second client device 212. Specifically, network device 100 transmits, by first antenna 140 connected to first radio 130, downlink traffic to antenna 242 of second client device 212. Network device 100 communicates with first client device 210 and second client device 212 based on a channel access protocol.

In this manner, the example system 200 of FIGS. 2A and 2B may mitigate ACI for a dual radio network device. For instance, in such examples, network device 100 may determine that first client device 210 and second client device 212 are within a steering threshold, and based on such determination, steer second client device 212 from second radio 132 to first radio 130, thereby avoiding simultaneously receiving uplink traffic from first client device 210 by first radio 130 and transmitting downlink traffic to second client device 212 by second radio 132 when ACI would (or may) occur between such communications. Moreover, in such examples, network device 100 may communicate, using first radio 130, with first client device 210 and second client device 212, thereby providing communications with first and second client devices 210 and 212 while mitigating ASCI between such communications.

FIGS. 3A to 3D shows an example functionality 300 of an example network device for mitigating adjacent channel interference for dual radios. Functionality 300 may be implemented as a method or may be executed as one or more instructions on a machine (e.g., by at least one processor), where the one or more instructions are included on at least one machine-readable storage medium (e.g., a non-transitory machine readable-storage medium.) While eighteen blocks (305 to 390) are shown in functionality 300, functionality 300 may include other actions described herein. Additionally, although the blocks are shown in an order, blocks depicted in FIGS. 3A to 3D may be performed in any order and at any time. Also, some of the blocks shown in functionality 300 may be omitted without departing from the spirit and scope of this disclosure. Functionality 300 may be implemented on a network device according to any of the examples herein.

Figure 3A:
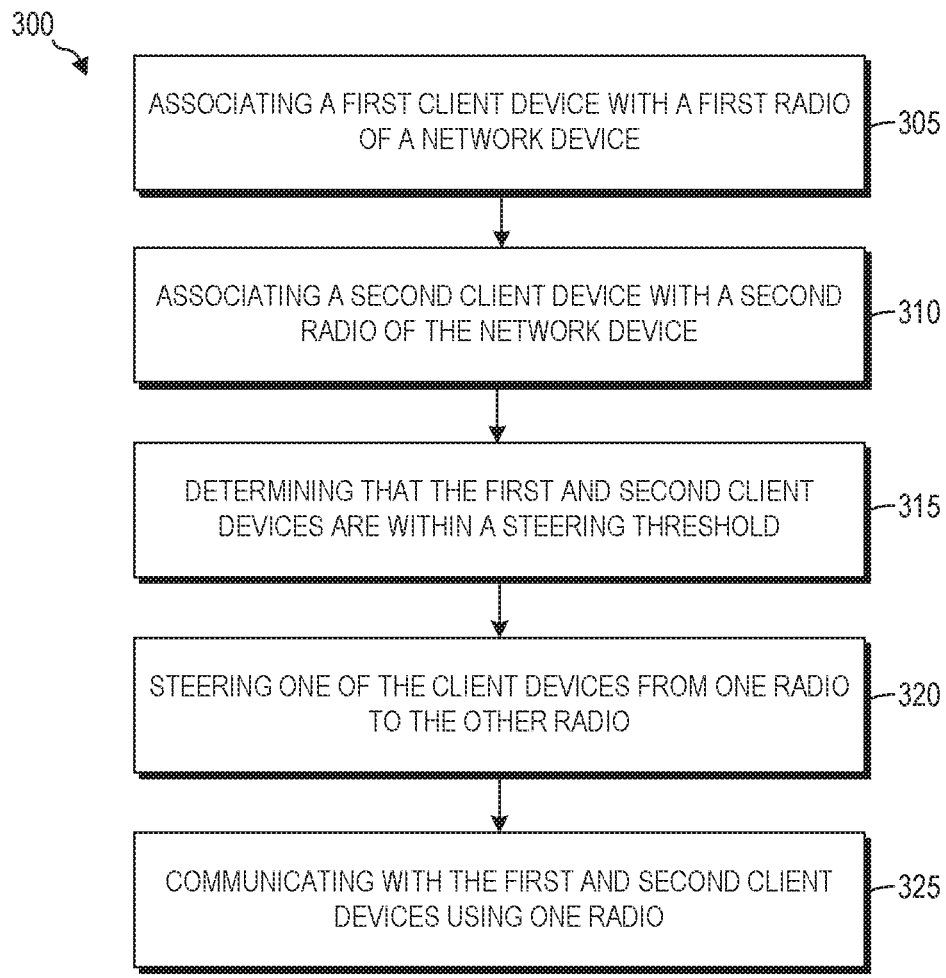
FIGS. 3A to 3D shows an example functionality 300 of a dual radio network device for mitigating adjacent channel interference.

As shown in block 305 of FIG. 3A, functionality 300 may include associating, by the network device, a first client device with a first radio of the network device. Moreover, as shown in block 310 of FIG. 3A, functionality 300 may include associating, by the network device, a second client device with a second radio of the network device. Associating a client device (e.g., first client device, second client device, etc.) with a radio (e.g., first radio, second radio, etc.) of the network device may comprise transmitting and/or receiving one or more management frames, which may include, but is not limited to, one or more of the following actions: transmitting, by the network device, a beacon frame to the client device; receiving, by the network device a probe request from the client device; transmitting, by the network device, a probe response to the client device; receiving, by the network device, an authentication frame from the client device; or transmitting, by the network device, an association, re-association, and/or disassociation frame to the client device.

As shown in block 315 of FIG. 3A (and FIGS. 3B to 3D), functionality 300 may include determining, by the network device, that the first and second client devices are within a steering threshold. Determining that the first client device and the second client device are within the steering threshold may be based on an actual distance between the first and second client devices. Alternatively, determining that the first and second client devices are within the steering threshold may be independent of an actual distance between the first and second client devices. For instance, it may be determined that the first and second client devices are within the steering threshold, even though at the time of such determination, an actual distance between the first and second client devices is beyond (i.e., greater than) a predetermined distance at which ACI would occur during simultaneous communication by the network device with the first and second client devices. Furthermore, determining that the first and second client devices are within the steering threshold may be based on (e.g., in response to) receiving, by the network device, instructions to simultaneously receive uplink traffic from the first client device by the first radio and transmit downlink traffic to the second client device by the second radio. Alternatively, determining that the first and second client devices are within the steering threshold may be based on (e.g., in response to) simultaneously receiving, by the first radio, uplink traffic from the first chant device and transmitting, by the second radio, downlink traffic to the second client device.

As shown in block 320 of FIG. 3A, functionality 300 may include steering, by the network device, one of client devices (i.e., one of the first and second client devices) from one of the radios (i.e., one of the first and second radios) to the other radio (i.e., the other one of the first and second radios). Steering one of the client devices from one radio to the other radio may be based on (e.g., in response to) the determination that the first and second chant devices are within the steering threshold. Moreover, steering one of the client devices from one radio to the other radio may comprise disassociating, by the network device, the client device with one radio and associating, by the network device, the client device with the other radio. Furthermore, steering the one of client devices from the one radio to the other radio may comprise transmitting, by the network device, a message to the client device to instruct the client device to disassociate with one radio and associate with the other radio.

As shown in block 325 of FIG. 3A, functionality 300 may include communicating with the first and second client devices using one radio (i.e., one of the first radio and second radios). Communicating with the first and second chant devices using one radio may comprise receiving, by the radio, uplink traffic from the first client device, and transmitting, by the radio, downlink traffic to the second client device. In addition, receiving uplink traffic from the first client device may comprise receiving (e.g., intercepting), by an antenna (e.g., first antenna, second antenna) connected to the radio, uplink traffic from the first client device. Moreover, transmitting downlink traffic to the second client device may comprise transmitting (e.g., radiating), by the antenna connected to the radio, downlink traffic to the second client device.

Figure 3B:
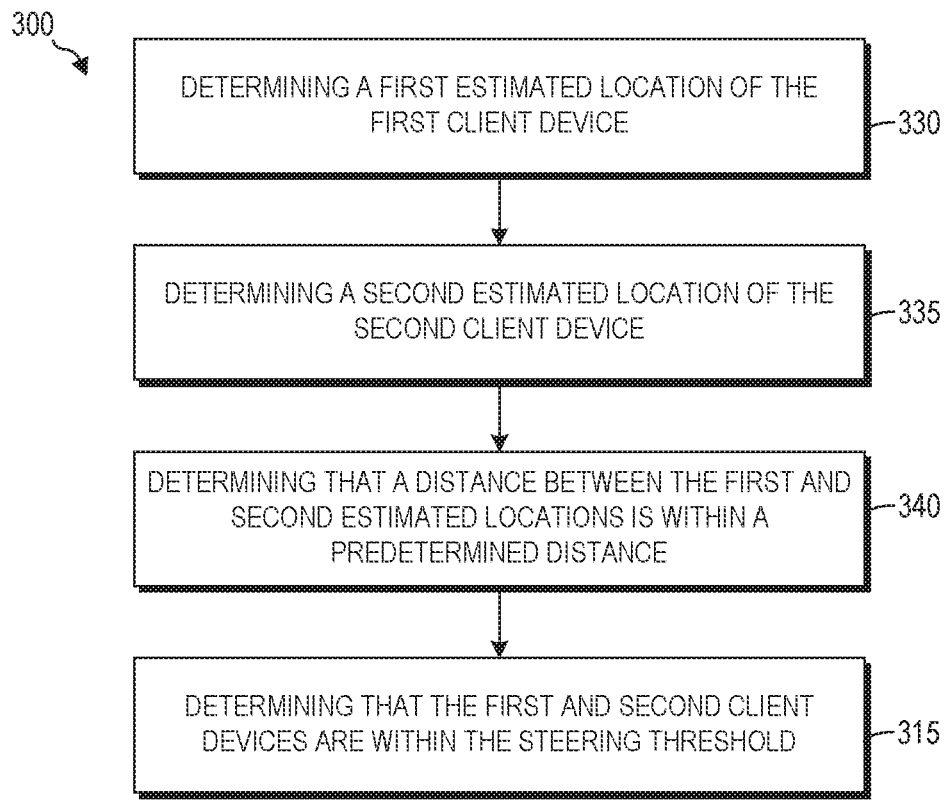

As shown in block 330 of FIG. 3B, functionality 300 may include determining, by the network device, a first estimated location of the first chant device. Moreover, as shown in block 335 of FIG. 3B, functionality 300 may include determining, by the network device, a second estimated location of the second client device. Determining an estimated location (e.g., first estimated location, second estimated location, etc.) of a client device (e.g., first client device, second client device, etc.) may comprise providing location-based services using Wi-Fi, Bluetooth, Bluetooth Low Energy (BLE), ZigBee, cellular communications (e.g., 3G, 4G, 5G), or a combination thereof.

As shown in block 340 of FIG. 3B, functionality 300 may include determining, by the network device, that a distance between the first and second estimated locations is within a predetermined distance. Furthermore, based on (e.g., in response to) the determination that the distance between the first and second estimated locations is within the predetermined distance (at block 340), functionality may proceed to block 315.

Figure 3C:
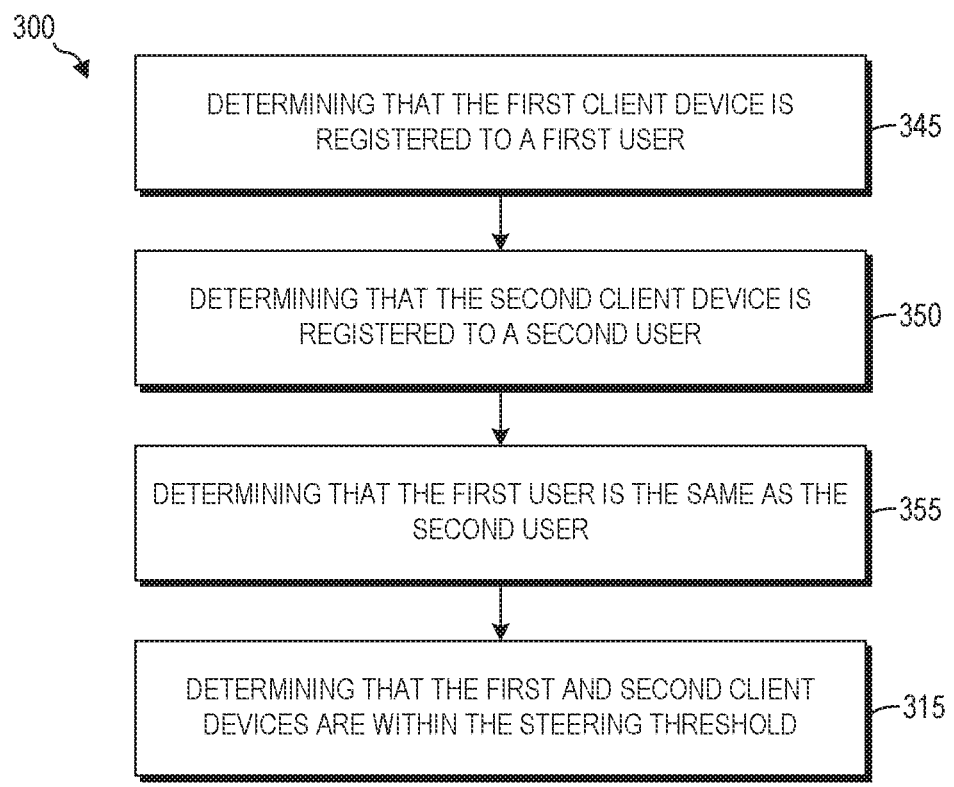

As shown in block 345 of FIG. 3C, functionality 300 may include determining, by the network device, that the first client device is registered to a first user. Moreover, as shown in block 350 of FIG. 3C, functionality 300 may include determining, by the network device, that the second client device is registered to a second user. Determining that a client device (e.g., first client device, second client device, etc.) is registered to a user (e.g., first user, second user, etc.) may comprise receiving user information (of one or more entities) associated with the client device. In addition, receiving user information may comprise transmitting, by the network device to a controller, a request to receive user information associated with the client device. Furthermore, receiving user information may comprise, based on (e.g., in response to) transmitting the request to receive user information associated with the client device, receiving, by the network device from the controller, user information associated with the client device from the controller.

As shown in block 355 of FIG. 3C, functionality 300 may include determining, by the network device, that the first user is the same as the second user. Furthermore, based on (e.g., in response to) the determination that the first user is the same as the second user (at block 355), functionality may proceed to block 315.

Figure 3D:
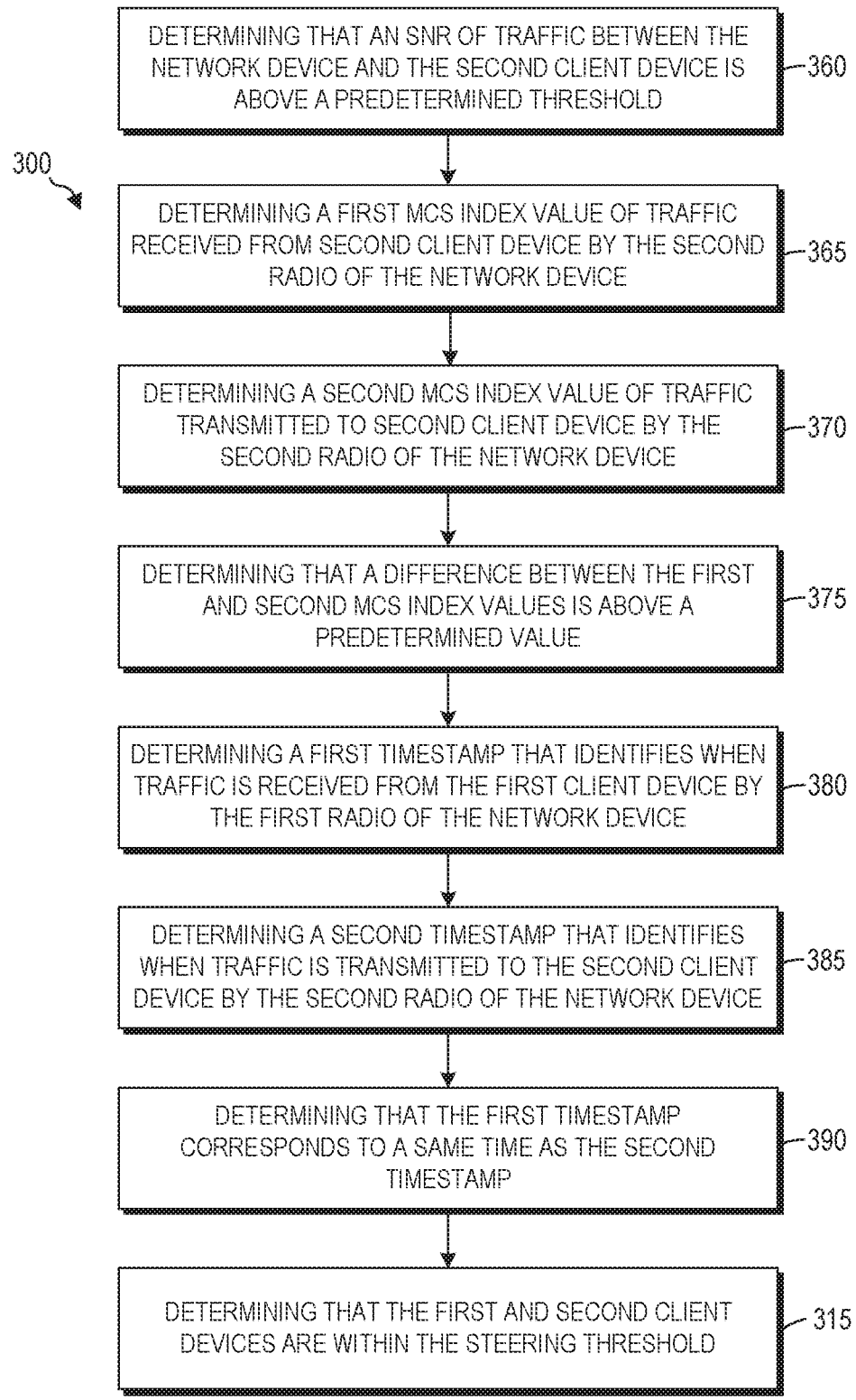

As shown in block 360 of FIG. 3D, functionality 300 may include determining that a SNR of traffic between the second client device and the network device is above a predetermined threshold. Moreover, based on (e.g., in response to) the determination that the SNR of traffic between the second client device and the network device is above the predetermined threshold, functionality 300 may proceed to block 365.

As shown in block 365 of FIG. 3D, functionality 300 may include determining a first MCS index value of uplink traffic received from the second client device by the second radio. In addition, as shown in block 370 of FIG. 3D, functionality 300 may include determining a second MCS index value of downlink traffic transmitted to the second client device by the second radio. Furthermore, as shown in block 375 of FIG. 3D, functionality 300 may include determining that a difference between the first and second MCS index values is above a predetermined value. Moreover, based on (e.g., in response to) the determination that the difference between the first and second MCS index values is above the predetermined value, functionality 300 may proceed to block 380.

As shown in block 380 of FIG. 3D, functionality 300 may include determining a first timestamp that identifies when uplink traffic is received from the first client device by the first radio of the network device. In addition, as shown in block 385 of FIG. 3D, functionality 300 may include determining a second timestamp that identifies when downlink traffic is transmitted to the second client device by the second radio of the network device. Furthermore, as shown in block 390 of FIG. 3D, functionality 300 may include determining that the first timestamp corresponds to a same time as the second timestamp. Moreover, based on (e.g., in response to) the determination that the first timestamp corresponds to the same time as the second timestamp, functionality 300 may proceed to block 315.

In this manner, example functionality 300 of FIGS. 3A to 3D of an example dual radio network device may mitigate ACI. For instance, functionality 300 may include determining, by the network device, that a first and second client devices are within a steering threshold (e.g., at block 315), and based on this determination, steering, by the network device, the second client device from the second radio to the first radio (e.g., at block 320), thereby avoiding simultaneously receiving uplink traffic from the first client device by the first radio and transmitting downlink traffic to the second client device by the second radio when ACI would (or may) occur between such communications. Moreover, functionality 300 may include communicating, using the first radio, with the first and second client devices (e.g., at block 325), thereby providing communications with the first and second client devices while mitigating ACI between such communications.

Figure 4:
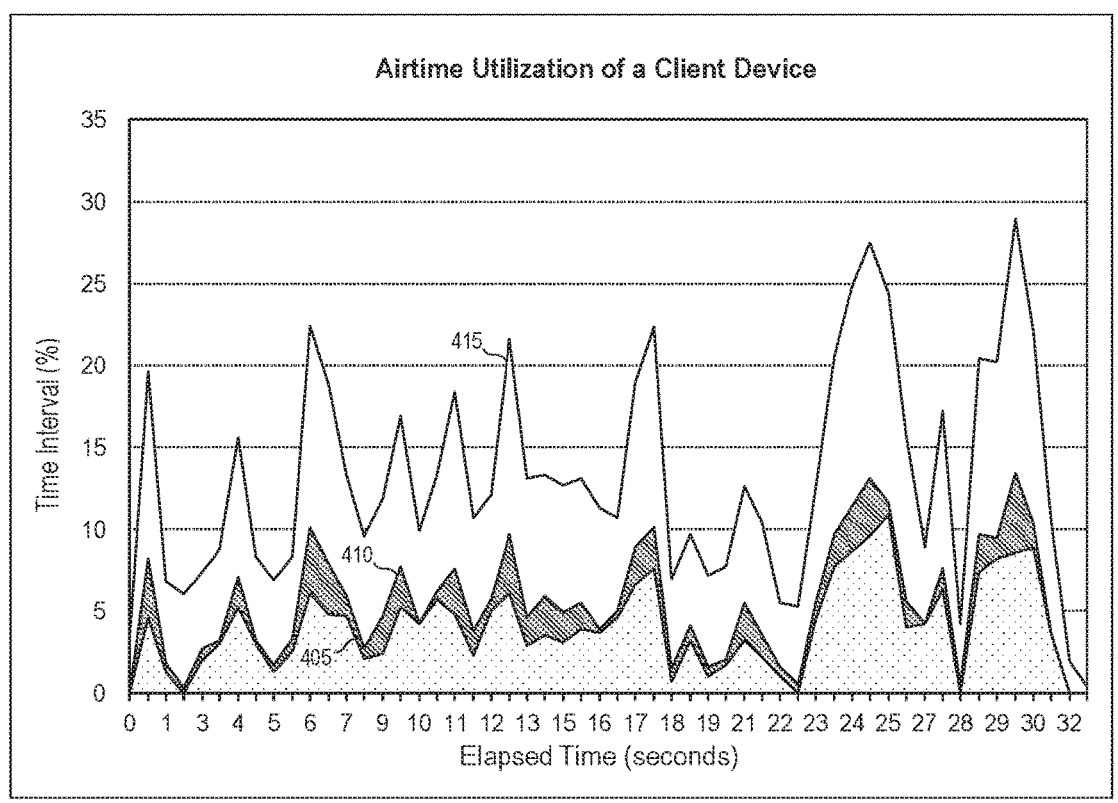
FIG. 4 is a graph 400 that shows airtime utilization of a client device in communication with a dual 5 GHz radio network device, according to existing techniques.

FIG. 4 is a graph 400 that shows airtime utilization of a client device in communication with a dual 5 GHz radio network device, according to existing techniques. As shown in FIG. 4, airtime utilization is measured as a percentage of an airtime interval of the client device versus elapsed time. The airtime utilization results shown in FIG. 4 were obtained by simultaneously receiving, by a first 5 GHz radio of the network device, uplink traffic from a first client device, and transmitting, by a second 5 GHz radio of the network device, downlink traffic to a second client device (i.e., the client device). The first 5 GHz radio of the network device was configured to operate at 5.50 GHz with a 80 MHz channel width in the U-NII-2C sub-band, and the second 5 GHz radio of the network device was configured to operate at 5.32 GHz with a 80 MHz channel width in the U-NII-2A sub-band. Moreover, the results of FIG. 4 were obtained while each of the first and second 5 GHz radios of the network device had nine other devices associated with that radio (i.e., each 5 GHz radio was configured to have a total of ten client devices simultaneously associated with that radio). Such configuration simulates a typical scenario in which multiple client devices are associated with each radio of a network device. In addition, the results of FIG. 4 were obtained while using an Aruba® AP-345 WAP as the network device, a Dell® XPS 13 9360 laptop with an Intel® 8265 Wi-Fi card as the first client device, and an Apple® iPhone XR smartphone as the second client device. Furthermore, the results of FIG. 4 were obtained while the first and second client devices were placed to be physically adjacent to each other (i.e., physically touching each other) and within the coverage area of the network device, and while the remaining client devices associated with each of the 5 GHz radios of the network device were distributed within the coverage area of the network device.

As noted above, the airtime utilization results shown in FIG. 4 were obtained while the network device was configured to simultaneously receive, by the first 5 GHz radio, uplink traffic from the first client device, and transmit, by the second 5 GHz radio, downlink traffic to the second client device (i.e., the client device). Throughput performance during this dual 5 GHz radio operation of the network device was compared with throughput performance during single 5 GHz radio operation of the network device (i.e., when the network device was either receiving uplink traffic from the first client device by the first 5 GHz radio or transmitting downlink traffic to the second client device by the second 5 GHz radio). It was observed that throughput of uplink traffic received by the network device from the first client device was not significantly different between the dual 5 GHz radio and single 5 GHz radio operations of the network device. However, it was discovered that throughput of downlink traffic transmitted by the network device to the second client device (i.e., the client device) was decreased for the dual 5 GHz radio operation of the network device as compared to the single 5 GHz radio operation of the network device. Specifically, it was discovered that the throughput decreased from 654 Mbps to 579 Mbps for the dual 5 GHz radio operation as compared to the single 5 GHz radio operation.

As shown in FIG. 4, curve 405 represents airtime utilization of data packets received (on first attempt) by the second client device (i.e., the client device) from the network device, curve 410 represents airtime utilization of data packet retries received by the second client device from the network device, and curve 415 represents airtime utilization of other portions of downlink traffic received by the second client device from the network device, including interframe space (IFS), preamble, sounding, management frame, control frame, and cyclic redundancy check (CRC) airtime utilization. As shown in FIG. 4, it was discovered that data packet retries (as shown by curve 410) consumed a significant percentage of airtime utilization of the downlink traffic as compared to data packets received on first try (as shown by curve 405). It was discovered this significant percentage of airtime utilization of data packet retries was caused by ACI between the downlink traffic and the uplink traffic. Moreover, when an MCS distribution of the network traffic was analyzed, it was discovered that, based on (in response to) an increased packet error rate (PER) of the downlink traffic due to the data packet retries, the network device had lower MCS index values (corresponding to lower data rates) for the downlink traffic as compared to the MCS index values for the uplink traffic. This, in turn, reduced throughput for the downlink traffic to the client device during simultaneous communications with the first and second client devices using the first and second 5 GHz radios.

Figure 5:
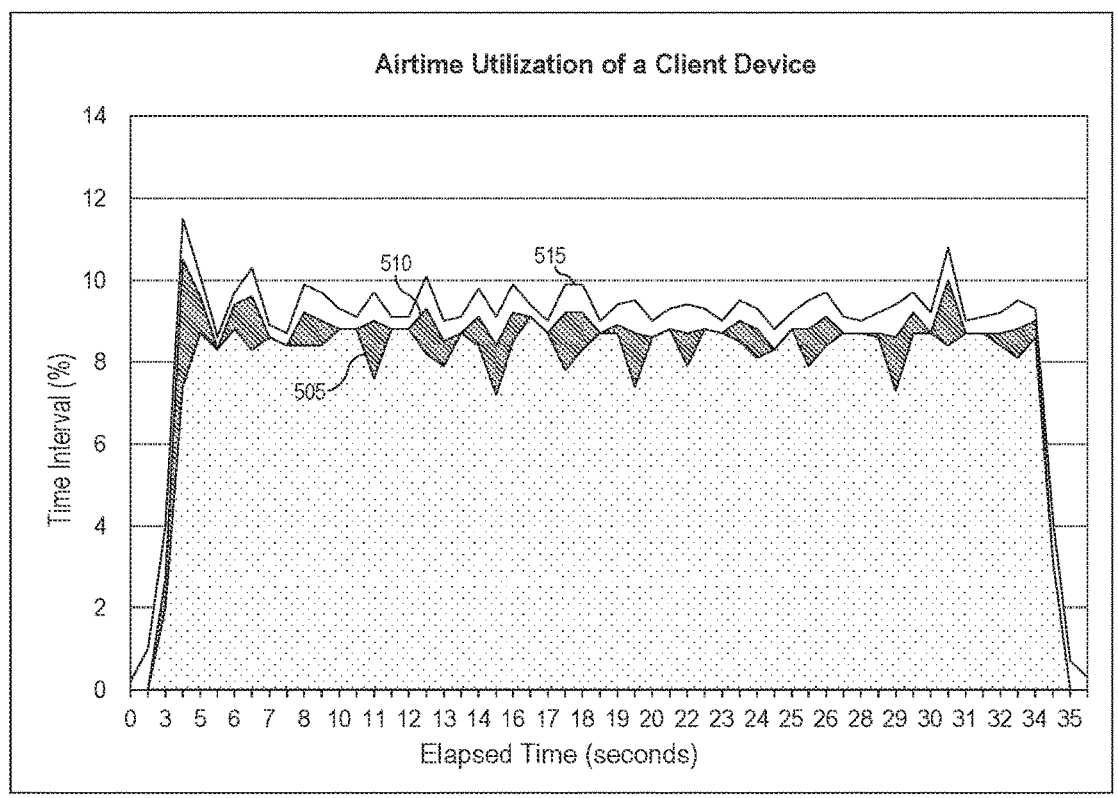
FIG. 5 is a graph 500 which shows airtime utilization for a client device in communication with a dual 5 GHz radio network device which mitigates adjacent channel interference, according to the present invention.

FIG. 5 is a graph 500 which shows airtime utilization for a client device in communication with a dual 5 GHz radio network device which mitigates adjacent channel interference, according to the present invention. As shown in FIG. 5, airtime utilization is measured as a percentage of an airtime interval of the client device versus elapsed time. The airtime utilization results shown in FIG. 5 were obtained by communicating, using a second 5 GHz radio of the network device, with the first and second client devices. Specifically, the airtime utilization results were obtained by receiving, by the second 5 GHz radio, uplink traffic from a first client device, and transmitting, by the second 5 GHz radio, downlink traffic to a second client device (i.e., the client device) based on 802.11 channel access contention. The results of FIG. 5 were obtained while using the same network device (Aruba® AP-345 WAP), first client device (Dell® XPS 13 9360 laptop with an Intel® 8265 Wi-Fi card), and second client device (Apple® iPhone XR, i.e., "the client device") used to obtain the results of FIG. 4. Moreover, the results of FIG. 5 were obtained while the first 5 GHz radio of the network device was configured to operate at 5.50 GHz with a 80 MHz channel width in the U-NII-2C sub-band, and the second 5 GHz radio of the network device was configured to operate at 5.32 GHz with a 80 MHz channel width in the U-NII-2A sub-band. In addition, the results of FIG. 5 were obtained while each 5 GHz radio was configured to have a total of ten client devices simultaneously associated with that radio (here, the first and second client devices were two of the ten client devices associated with the second 5 GHz radio). Furthermore, the results of FIG. 5 were obtained while the first and second client devices were placed to be physically adjacent to each other and within the coverage area of the network device, and while the remaining client devices associated with each of the 5 GHz radios were distributed within the coverage area of the network device.

As noted above, the airtime utilization results shown in FIG. 5 were obtained while the network device was configured to receive, by the second 5 GHz radio of the network device, uplink traffic from the first client device, and transmit, by the second 5 GHz radio of the network device, downlink traffic to the second client device (i.e., the client device). To provide such communication with both the first and second client devices via a single 5 GHz radio (the second 5 GHz radio) of the network device, the network device steered the first client device from the first 5 GHz radio to the second 5 GHz radio, and then provided communication with both the first and second client devices using the second 5 GHz radio based on 802.11 channel access contention. Throughput performance during such operation of the network device was compared with throughput performance during single 5 GHz radio operation of the network device (i.e., when the network device was transmitting downlink traffic or receiving uplink traffic by only one of its 5 GHz radios). It was discovered that during communication by the network device with both the first and second client devices based on 802.11 channel access contention, the network device achieved a similar throughput (656 Mbps) as compared to during single 5 GHz radio operation (i.e., when the network device was either receiving uplink traffic from the first client device by the first 5 GHz radio or transmitting downlink traffic to the second client device by the second 5 GHz radio).

As shown in FIG. 5, curve 505 represents airtime utilization of data packets received (on first attempt) by the second client device (i.e., the client device) from the network device, curve 510 represents airtime utilization of data packet retries received by the second client device from the network device, and curve 515 represents airtime utilization of other portions of downlink traffic received by the second client device from the network device, which includes IFS, preamble, sounding, management frame, control frame, and CRC airtime utilization. As shown in FIG. 5, it was discovered that data packet retries (as shown by curve 510) did not consume a significant percentage of airtime utilization of the downlink traffic, as compared to data packets received on first try (as shown by curve 505). Moreover, when an MCS distribution of the network traffic was analyzed, it was discovered that the network device had similar MCS index values for both uplink and downlink traffic.

Therefore, whereas existing techniques for operating a dual 5 GHz radio network device suffer from ACI that increases a percentage of airtime utilization of downlink traffic for data packet retries (as shown in FIG. 4), and thereby decreases the throughput of the downlink traffic to the client device, techniques according to the present invention mitigate ACI and prevent degradation of downlink traffic to the client device (as shown in FIG. 5).

Figure 6:
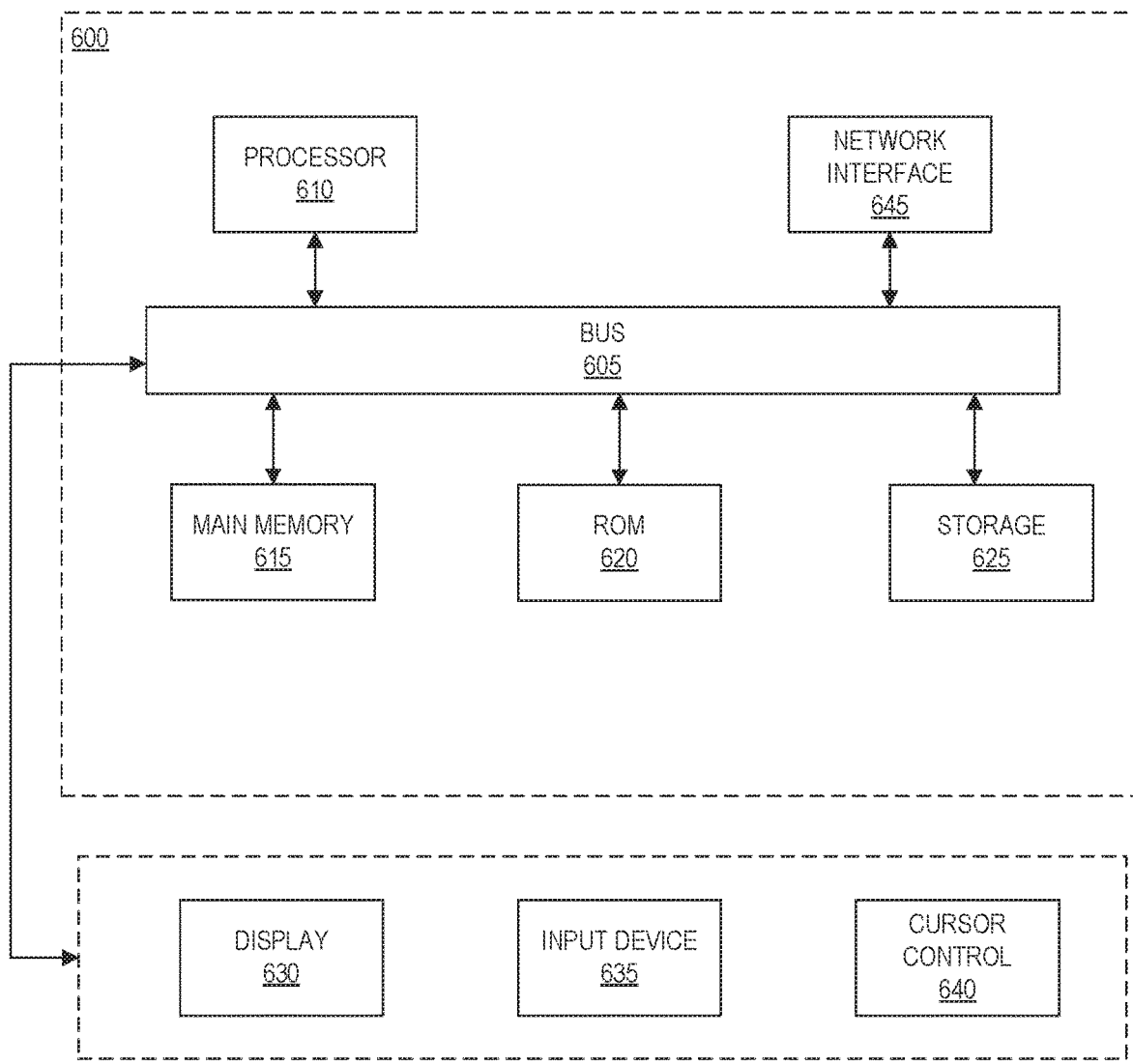
FIG. 6 is a block diagram of an example computer system 600 in which various embodiments described herein for mitigating adjacent channel interference for a dual radio network device may be implemented.

FIG. 6 is a block diagram of an example computer system 600 in which various embodiments described herein for mitigating adjacent channel interference for a dual radio network device may be implemented.

Computer system 600 includes bus 605 or other communication mechanism for communicating information, at least one hardware processor 610 coupled with bus 605 for processing information. At least one hardware processor 610 may be, for example, at least one general purpose microprocessor.

Computer system 600 also includes main memory 615, such as random access memory (RAM), cache, other dynamic storage devices, or the like, or a combination thereof, coupled to bus 605 for storing information and one or more instructions to be executed by at least one processor 610, Main memory 615 also may be used for storing temporary variables or other intermediate information during execution of one or more instructions to be executed by at least one processor 610. Such one or more instructions, when stored on storage media accessible to at least one processor 610, render computer system 600 into a special-purpose machine that is customized to perform the operations specified in the one or more instructions.

Computer system 600 may further include read only memory (ROM) 620 or other static storage device coupled to bus 605 for storing static of one or more instructions to be executed by at least one processor 610. Such one or more instructions, when stored on storage media accessible to at least one processor 610, render computer system 600 into a special-purpose machine that is customized to perform the operations specified in the one or more instructions.

Computer system 600 may further include information and one or more instructions for at least one processor 610. At least one storage device 625, such as a magnetic disk, optical disk, or USB thumb drive (Flash drive), or the like, or a combination thereof, may be provided and coupled to bus 605 for storing information and one or more instructions.

Computer system 600 may further include display 630 coupled to bus 605 for displaying a graphical output to a user. The computer system 600 may further include input device 635, such as a keyboard, camera, microphone, or the like, or a combination thereof, coupled to bus 605 for providing an input from a user, Computer system 600 may further include cursor control 640, such as a mouse, pointer, stylus, or the like, or a combination thereof, coupled to bus 605 for providing an input from a user.

Computer system 600 may further includes at least one network interface 645, such as a network interface controller (NIC), network adapter, or the like, or a combination thereof, coupled to bus 605 for connecting computer system 600 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked based on (e.g., in response to) detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 based on (e.g., in response to) at least one processor 610 executing one or more sequences of one or more instructions contained in main memory 615. Such one or more instructions may be read into main memory 615 from another storage medium, such as at least one storage device 625. Execution of the sequences of one or more instructions contained in main memory 615 causes at least one processor 610 to perform the process steps described herein. In alternative embodiments, hard-wired circuitry may be used in place of or in combination with software instructions.

In examples described herein, the term "Wi-Fi" is meant to encompass any type of wireless communications that conforms to any IEEE 802.11 standards, whether 802.11 ac, 802.11ax, 802.11a, 802.11n, etc. The term "Wi-Fi" is currently promulgated by the Wi-Fi Affiance®. Any products tested and approved as "Wi-Fi Certified" (a registered trademark) by the Wi-Fi Alliance are certified as interoperable with each other, even if they are from different manufacturers. A user with a "Wi-Fi Certified" (a registered trademark) product can use any brand of WAP with any other brand of client hardware that also is certified. Typically, however, any Wi-Fi product using the same radio frequency band (e.g., 5 GHz band for 802.11ac) will work with any other, even if such products are not "Wi-Fi Certified." The term "Wi-Fi" is further intended to encompass future versions and/or variations on the foregoing communication standards. Each of the foregoing standards is hereby incorporated by reference.

As used herein, the term "Bluetooth" is meant to encompass any type of wireless communications that conforms to at least one of the Bluetooth® specifications. As used therein, the term "Bluetooth Low Energy" is meant to encompass any type of wireless communications that conforms to at least one of the Bluetooth® Low Energy specifications. The terms "Bluetooth" and "Bluetooth Low Energy" are currently promulgated by the Bluetooth SIG.

As used herein, the term "ZigBee" is meant to encompass any type of wireless communication that conforms to at least one of the specifications of the ZigBee® Specification. The term "ZigBee" is currently promulgated by the ZigBee Alliance.

In examples described herein, "throughput" refers to a rate of successful data transmission across a communication link (e.g., a wireless link). Throughput may depend on a bandwidth of the communication link, a maximum rate of data transmission (i.e., peak data rate or peak bit rate) across the communication link, or a combination thereof. Moreover, throughput may depend on an amount of data packet loss during data transmission across the communication link. For example, a network device may increase throughput, and thereby improve performance, by increasing bandwidth of a communication link, reducing data packet loss during data transmission across the communication link, or a combination thereof. The throughput of a wireless link may be diminished by degradation of signal quality of wireless signals transmitted and/or received to establish the wireless link.

In examples described herein, "coverage range" refers to a maximum distance at which there is successful data transmission across a wireless link, even if throughput of such data transmission is low. The coverage range of a wireless link may be diminished by de-sensitization of wireless signals transmitted and/or received to establish the wireless link.

In examples described herein, the term "non-transitory media," and similar terms, refers to any electronic, magnetic, optical, or other physical storage device that contains or stores executable instructions. Non-transitory media may comprise non-volatile media and/or volatile media, Non-volatile media includes, for example, optical or magnetic disks. Volatile media includes, for example, dynamic memory. Common forms of non-transitory machine-readable media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method, comprising:
   associating, by a network device, a first client device with a first radio of the network device;
   associating, by the network device, a second client device with a second radio of the network device;
   determining first and second estimated locations of the first and second client devices, respectively;
   determining that the first and second client devices are within a steering threshold based on distance between the first and second estimated locations of the first and second client devices being within a predetermined distance from one another by determining that the first and second client devices are registered to first and second users, respectively, and that the first and second users are the same;
   based on the determination that the first and second client devices are within the steering threshold, mitigating channel interference between the first and second radios of the network device by steering, by the network device, the second client device from the second radio to the first radio; and
   communicating, using the first radio of the network device, with the first and second client devices.

2. The method of claim 1, wherein communicating with the first and second client devices comprises:
   receiving, by the first radio, uplink traffic from the first client device; and
   transmitting, by the first radio, downlink traffic to the second client device.

3. The method of claim 1, wherein communicating with the first and second client devices is based on 802.11 channel access contention.

4. The method of claim 1, comprising:
   determining a first timestamp that identifies when uplink traffic is received from the first client device by the first radio;
   determining a second timestamp that identifies when downlink traffic is transmitted to the second client device by the second radio,
   determining that the first timestamp corresponds to a same time as the second timestamp;
   based on the determination that the first timestamp corresponds to the same time as the second timestamp, determining that the first and second client devices are within the steering threshold.

5. The method of claim 4, further comprising:
   determining a first modulation and coding scheme (MCS) index value of uplink traffic received from the second client device by the second radio;
   determining a second MCS index value of downlink traffic transmitted to the second client device by the second radio;
   determining that a difference between the first and second MCS index values is above a predetermined value; and
   based on the determination that the difference between the first and second MCS index values is above the predetermined value, determining the first and second timestamps.

6. The method of claim 5, further comprising:
   determining that a signal to noise ratio (SNR) of traffic between the network device and the second client device is above a predetermined threshold; and based on the determination that the SNR of traffic between the network device and the second client device is above the predetermined threshold, determining the first and second MCS index values.

7. The method of claim 1, further comprising:
alternatively mitigating channel interference between the first and second radios of the network device based on a determination that the distance between the first and second estimated locations of the first and second client devices exceeds the predetermined distance, and that the network device has received instructions to simultaneously receive uplink traffic from the first client device by the first radio and transmit downlink traffic to the second client device by the second radio.

8. A network device, comprising:
a first radio;
a second radio;
at least one processing resource; and
at least one non-transitory machine-readable storage medium comprising instructions executable by at least one processing resource to:
associate a first client device with the first radio;
associate a second client device with the second radio;
determine first and second estimated locations of the first and second client devices, respectively;
determine that the first and second client devices are within a steering threshold based on distance between the first and second estimated locations of the first and second client devices being within a predetermined distance from one another by determining that the first and second client devices are registered to first and second users, respectively, and that the first and second users are the same;
based on the determination that the first and second client devices are within the steering threshold, mitigate channel interference between the first and second radios of the network device by steering the second client device from the second radio to the first radio; and
communicate, using the first radio, with the first and second client devices.

9. The network device of claim 8, wherein the instructions to communicate with the first and second client devices comprise instructions to:
receive uplink traffic from the first client device and transmit downlink traffic to the second client device based on a channel access protocol.

10. The network device of claim 8, wherein the instructions comprise instructions to:
determine a first timestamp that identifies when uplink traffic is received from the first client device by the first radio;
determine a second timestamp that identifies when downlink traffic is transmitted to the second client device by the second radio,
determine that the first timestamp corresponds to a same time as the second timestamp;
based on the determination that the first timestamp corresponds to the same time as the second timestamp, determine that the first and second client devices are within the steering threshold.

11. The network device of claim 10, wherein the instructions comprise instructions to:
determine that a signal to noise ratio (SNR) of traffic between the network device and the second client device is above a predetermined threshold;
determine a first modulation and coding scheme (MCS) index value of uplink traffic received from the second client device by the second radio;
determine a second MCS index value of downlink traffic transmitted to the second client device by the second radio;
determine that a difference between the first and second MCS index values is above a predetermined value; and
determine the first and second timestamps.

12. A system, comprising:
the network device of claim 8;
the first client device;
the second client device; and
a network, wherein the network device is connected to the network.

13. The network device of claim 8, wherein the instructions comprise further instructions to:
alternatively mitigate channel interference between the first and second radios based on a determination that the distance between the first and second estimated locations of the first and second client devices exceeds the predetermined distance, and that the network device has received instructions to simultaneously receive uplink traffic from the first client device by the first radio and transmit downlink traffic to the second client device by the second radio.

14. An article comprising at least one non-transitory machine-readable storage medium comprising instructions executable by at least one processing resource to:
associate a first client device with a first radio of a network device;
associate a second client device with a second radio of the network device;
determine first and second estimated locations of the first and second client devices, respectively;
determine that the first and second client devices are within a steering threshold based on distance between the first and second estimated locations of the first and second client devices being within a predetermined distance from one another by determining that the first and second client devices are registered to first and second users, respectively, and that the first and second users are the same;
based on the determination that the first and second client devices are within the steering threshold, mitigate channel interference between the first and second radios of the network device by disassociating the second client device with the second radio and associating the second client device with the first radio;
receive, by the first radio, uplink traffic from the first client device; and
transmit by the first radio, downlink traffic to the second client device.

15. The article of claim 14, wherein the instructions comprise instructions to:
determine a first timestamp that identifies uplink traffic received from the first client device by the first radio;
determine a second timestamp that identifies downlink traffic transmitted to the second client device by the second radio,
determine that the first timestamp corresponds to a same time as the second timestamp;
based on the determination that the first timestamp corresponds to the same time as the second timestamp, determine that the first and second client devices are within the steering threshold.

16. The article of claim 14, wherein the instructions comprise instructions to:
- determine that a signal to noise ratio (SNR) of traffic between the network device and the second client device is above a predetermined threshold;
- determine a first modulation and coding scheme (MCS) index value of uplink traffic received from the second client device by the second radio;
- determine a second MCS index value of downlink traffic transmitted to the second client device by the second radio;
- determine that a difference between the first and second MCS index values is above a predetermined value; and
- determine first and second timestamps.

17. The article of claim 14, wherein the instructions comprise further instructions to:
- alternatively mitigate channel interference between the first and second radios of the network device based on a determination that the distance between the first and second estimated locations of the first and second client devices exceeds the predetermined distance, and that the network device has received instructions to simultaneously receive uplink traffic from the first client device by the first radio and transmit downlink traffic to the second client device by the second radio.

* * * * *